United States Patent
Lee et al.

(10) Patent No.: US 11,081,683 B2
(45) Date of Patent: Aug. 3, 2021

(54) METHOD FOR ESTIMATING FILTER CLOGGING WITH SLURRY FOR ELECTRODE PREPARATION

(71) Applicant: LG Chem, Ltd., Seoul (KR)

(72) Inventors: Jeongyong Lee, Daejeon (KR); Ki Yeon Jo, Daejeon (KR); Hyejin Han, Daejeon (KR); Sangeun Kim, Daejeon (KR); Myunghan Lee, Daejeon (KR); Changkwon Chung, Daejeon (KR)

(73) Assignee: LG Chem, Ltd.

( * ) Notice: Subject to any disclaimer, the term of this patent is extended or adjusted under 35 U.S.C. 154(b) by 102 days.

(21) Appl. No.: 16/474,819

(22) PCT Filed: Jul. 2, 2018

(86) PCT No.: PCT/KR2018/007459
§ 371 (c)(1),
(2) Date: Jun. 28, 2019

(87) PCT Pub. No.: WO2019/031705
PCT Pub. Date: Feb. 14, 2019

(65) Prior Publication Data
US 2020/0127274 A1    Apr. 23, 2020

(30) Foreign Application Priority Data

Aug. 8, 2017  (KR) .................. 10-2017-0100054

(51) Int. Cl.
*H01M 4/04* (2006.01)
*H01M 4/1393* (2010.01)
(Continued)

(52) U.S. Cl.
CPC ....... *H01M 4/0404* (2013.01); *H01M 4/1393* (2013.01); *H01M 10/48* (2013.01); *H01M 2004/027* (2013.01)

(58) Field of Classification Search
CPC ... H01M 4/0404; H01M 4/1393; H01M 10/48
See application file for complete search history.

(56) References Cited

U.S. PATENT DOCUMENTS 7,410,601 B2   8/2008  Sato et al.
10,211,458 B2  2/2019  Kim
(Continued)

FOREIGN PATENT DOCUMENTS

CN    101174487 A    5/2008
CN    102473909      5/2012
(Continued)

OTHER PUBLICATIONS

Boris Bitsch, et. al.; "A novel slurry concept for the fabrication of lithium-ion battery electrodes with beneficial properties", Journal of Power Sources, vol. 265, Apr. 2014, pp. 81-90.
(Continued)

*Primary Examiner* — Olatunji A Godo
(74) *Attorney, Agent, or Firm* — Lerner, David, Littenberg, Krumholz & Mentlik, LLP

(57) ABSTRACT

A method for predicting the likelihood of coagulation of active material particles contained in a slurry for electrode preparation includes measuring rheological properties before and after the slurry is subjected to a shear. The estimation method enables a prediction of filter clogging with a slurry, and thus makes it possible to estimate the likelihood of filter clogging with a slurry without passing the slurry directly through the filter, thereby improving the efficiency of a battery manufacturing process.

7 Claims, 7 Drawing Sheets

SEM image and particle tumbling behavior of artificial graphite

(51) Int. Cl.
H01M 10/48 (2006.01)
H01M 4/02 (2006.01)

(56) References Cited

U.S. PATENT DOCUMENTS

| | | | |
|---|---|---|---|
| 10,226,573 | B2 | 3/2019 | Baek et al. |
| 2008/0083909 | A1* | 4/2008 | Sato .......................... H01B 1/22 252/512 |
| 2008/0102196 | A1 | 5/2008 | Morishima et al. |
| 2009/0159523 | A1 | 6/2009 | McCutchen |
| 2009/0304948 | A1 | 12/2009 | Witter et al. |
| 2011/0308299 | A1 | 12/2011 | Tabaru |
| 2013/0337319 | A1* | 12/2013 | Doherty .............. H01M 4/1397 429/209 |
| 2014/0234724 | A1 | 8/2014 | Nakamura et al. |
| 2015/0044565 | A1 | 2/2015 | Wang et al. |
| 2015/0311533 | A1 | 10/2015 | Tachibana et al. |
| 2015/0377759 | A1 | 12/2015 | Izumo et al. |
| 2017/0162863 | A1 | 6/2017 | Doherty et al. |

FOREIGN PATENT DOCUMENTS

| | | |
|---|---|---|
| CN | 104584315 A | 4/2015 |
| DE | 10343654 A1 | 4/2005 |
| JP | 4692705 B2 | 6/2011 |
| JP | 2017135062 A | 8/2017 |
| KR | 20110104953 A | 9/2011 |
| KR | 20140104335 A | 8/2014 |
| KR | 20150014782 A | 2/2015 |
| KR | 20150072374 A | 6/2015 |
| KR | 20150122570 A | 11/2015 |

OTHER PUBLICATIONS

International Search Report from Application No. PCT/KR2018/007459, dated Feb. 8, 2019.
Eker, et al., "Physics-based prognostic modelling of filter clogging phenomena," Mechanical Systems and Signal Processing, Elsever, Amsterdam, NL, Dec. 29, 2015, pp. 395-412, vol. 75.
Shen, et al.,"Experimental investigation of clogging dynamics in homogeneous porous medium," Water Resources Research, Mar. 1, 2017, pp. 1879-1890, vol. 53, No. 3.
Supplementary European Search Report with Written Opinion for Application No. 18843470.8 dated Nov. 20, 2019, 10 pages.
Chinese Seach Report for Application No. 201880005178.1, dated Apr. 19, 2021, 7 pages.

* cited by examiner

Oscillatory Strain  $\gamma(t) = \gamma_0 \sin(\omega t)$

Oscillatory Stress  $\sigma(t) = \sigma_0 \sin(\omega t + \delta)$
$= \gamma_0 [G'(\omega)\sin(\omega t) + G''(\omega)\cos(\omega t)]$ $\tan \delta = G''(\omega) / G'(\omega)$

METHOD FOR ESTIMATING FILTER CLOGGING WITH SLURRY FOR ELECTRODE PREPARATION

CROSS-REFERENCE TO RELATED APPLICATIONS

This application is a national phase entry under U.S.C. § 371 of International Application No. PCT/KR2018/007459, filed Jul. 2, 2018, which claims priority to Korean Patent Application No. 10-2017-0100054, filed Aug. 8, 2017 the disclosures of which are incorporated herein by reference.

TECHNICAL FIELD

The present invention relates to a method for evaluating filter clogging that can occur during coating of slurry for manufacturing an electrode.

BACKGROUND ART

Technological development and increased demand for portable electronic devices such as mobile devices have led to a rapid increase in the demand for secondary batteries as energy sources. Among these secondary batteries, a lithium secondary battery having high energy density and voltage, long cycle span and low self-discharge are commercially available and widely used.

In particular, since the lithium secondary battery has an operating voltage of 3.6 V or more, which is three times higher than the operating voltage of a nickel-cadmium battery or a nickel-metal hydride battery that is widely used as a power source of portable electric devices, and has high energy density per unit weight, the use of the lithium secondary battery is rapidly increasing.

The lithium secondary battery is prepared by using materials capable of intercalating and deintercalating lithium ions as a negative electrode and a positive electrode, and charging an organic electrolyte or polymer electrolyte between the positive electrode and the negative electrode. The lithium secondary battery generates electrical energy by oxidation and reduction reactions when lithium ions are intercalated and deintercalated in the positive electrode and the negative electrode.

The negative electrode used in the lithium secondary battery is generally formed by coating a current collector with a carbon-based negative electrode active material. As the negative electrode active material, crystalline carbon such as natural graphite or artificial graphite having high theoretical capacity threshold has been used conventionally. When the electrode is coated with active material slurry, large particles are filtered through a filter before coating to prevent the large particles in the slurry from being coated. In general, in the case of negative electrode active material slurry, the filter clogging issue is not frequent because the active material particles are well dispersed. However, recently, there are a lot of filter clogging issue while applying artificial graphite to prevent swelling of the negative electrode active material slurry. The artificial graphite has plate-like structure, and the occurrence of the filter clogging issue is caused by shear-induced gelation of the artificial graphite. Accordingly, when electrodes are manufactured using the artificial graphite, there is a problem in that processability is significantly deteriorated due to the difficulty of constant loading control.

Since there is no research on the cause of such filter clogging issue or a method for determining the clogging, the present invention proposes an evaluation method for identifying the issue. Namely, the present invention proposes a method for evaluating the filer clogging issue caused by artificial graphite contained in slurry for manufacturing an electrode of a battery and the like.

DISCLOSURE

Technical Problem

In order to solve the above problems in the art, an object of the present invention is to provide a method for analyzing a cause of filter clogging issue occurring during coating of slurry for manufacturing an electrode and evaluating the issue through rheological properties such as viscosity, phase angle (δ) and crossover frequency.

Technical Solution

In order to achieve one object, in one embodiment, the present invention provides a method for evaluating filter clogging of slurry for manufacturing an electrode, which comprises the following steps:

calculating a shear rate, generated when the slurry passes through the filter, through simulation;

measuring phase angle (°) and crossover frequency (Hz) before and after applying the calculated shear rate to the slurry; and determining filter clogging according to the change in the measured values, wherein the case that the difference of the phase angle (δ) before and after applying shear is 15° or more and the case that the crossover frequency is less than 0.1 Hz before applying shear and the crossover frequency is 0.1 Hz or more after applying shear are evaluated as filter clogging.

According to one embodiment, the electrode may be a negative electrode.

According to one embodiment, the phase angle (δ) before applying shear to the slurry may be 55° to 70°, and the case that the difference of the phase angle (δ) before and after applying shear to the slurry is 15° or more may be evaluated as filter clogging.

According to one embodiment, the shear rate may be 2000 $s^{-1}$ or more.

According to one embodiment, the slurry for manufacturing a negative electrode of a battery may contain at least one metal-based active material selected from metals such as Al, Si, Sn etc., that can combine with lithium, amorphous compounds mainly composed of oxides such as $SiO_2$, $SnO_2$, etc., and lithium titanate ($Li_4Ti_5O_{12}$); and at least one carbon-based active material selected from natural graphite, artificial graphite, soft carbon, hard carbon and graphene.

According to one embodiment, the slurry for manufacturing a negative electrode may contain plate-type artificial graphite.

Advantageous Effects

The present invention provides a method that can evaluate filter clogging by predicting coagulation possibility of active material particles contained in slurry, by measuring rheological properties, for example, viscosity, phase angle (δ) and crossover frequency, of slurry for manufacturing an electrode before and after applying shear. By providing such evaluation method, the present invention can evaluate the possibility of filter clogging of slurry without passing the slurry directly through a filter. Accordingly, the present invention improves efficiency of a battery manufacturing process.

BEST MODE CARRYING OUT THE INVENTION

Various changes in form and details may be made to the presently disclosed embodiment and thus should not be construed as being limited to the aspects set forth herein. The presently disclosed embodiment is not limited to the aspects described in the present description, and thus it should be understood that the presently disclosed embodiment includes every kind of variation example or alternative equivalent included in the spirit and scope of the presently disclosed embodiment. Also, while describing the aspects, detailed descriptions about related well-known functions or configurations that may diminish the clarity of the points of the aspects of the presently disclosed embodiment will be omitted.

The present invention provides a method for evaluating a cause of filter clogging issue of slurry for manufacturing an electrode or the filter clogging issue.

When coating slurry for manufacturing an electrode to an electrode, large particles are generally filtered through a 100 mesh (mesh size: 150 mm) filter before coating. However, if the particles in the slurry are larger than the mesh size of the filter, the filter can be blocked by the particles and filter clogging issue may occur if the particles continuously block the filter.

Figure 1:
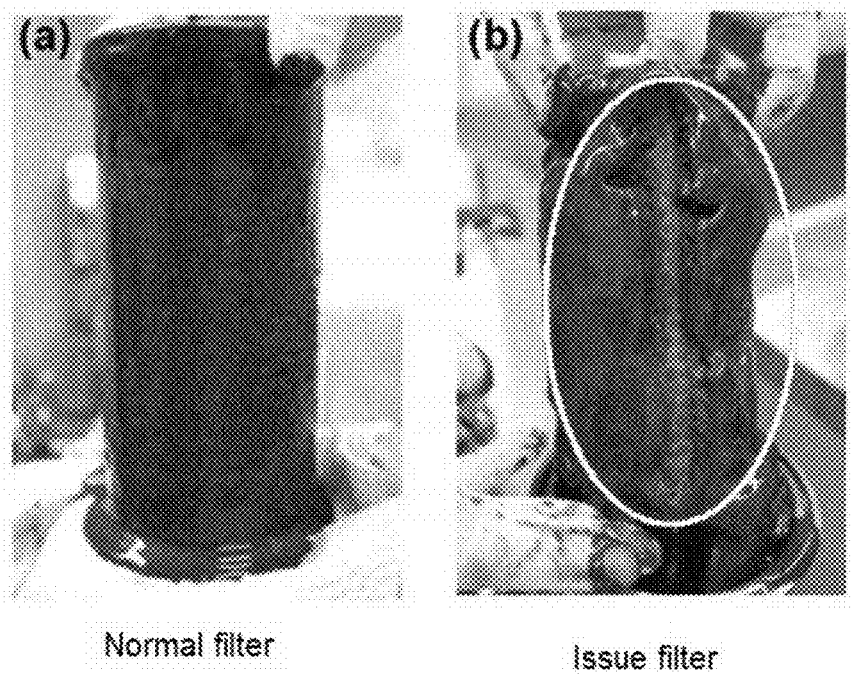
FIG. 1 shows pictures of (a) a normal filter without filter clogging and (b) a filter with filter clogging during a slurry filtering process.

FIG. 1(b) is a picture showing filter clogging phenomenon of electrode slurry, and unlike a normal filter (FIG. 1(a)), the particles in the slurry block the filter, making it difficult for the slurry to pass through.

Figure 2:
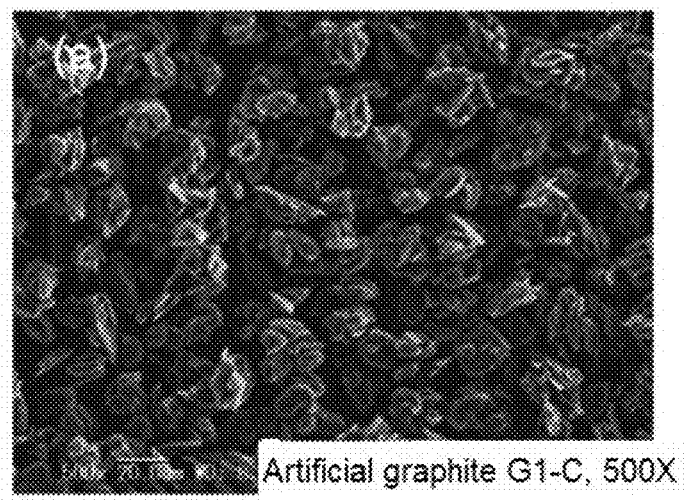
FIG. 2 shows (a) an SEM image of plate-type artificial graphite and (b) tumbling behavior of artificial graphite particles.
Figure 2:
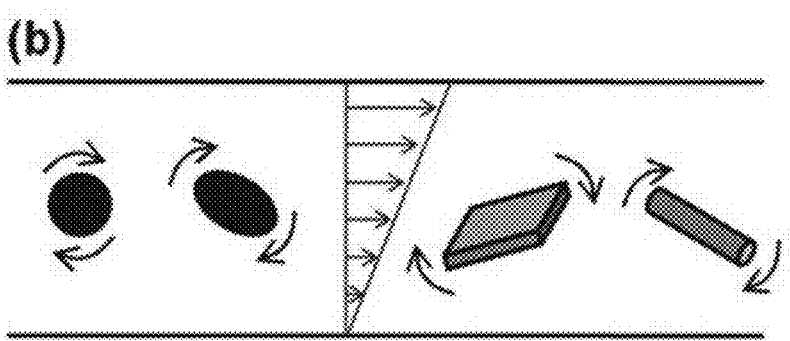

The particles of the electrode slurry tumble by shear as the slurry passes through the filter. For examples, in the case of artificial graphite used to prevent expansion of negative electrode slurry, since it has a plate-type particle structure as shown in the SEM image of FIG. 2(a), the particle has larger aspect ratio than a spherical particle. As the aspect ratio increases, the volume occupied by tumbling by shear increases, and as the volume increases, coagulation is likely to occur due to high probability of collision with other particles as shown in FIG. 2(b). Such particle coagulation may cause filter clogging issue.

In one embodiment, the method for evaluating filter clogging issue of the present invention is characterized by comprising the following steps:

calculating a shear rate, generated when the slurry for manufacturing an electrode passes through a filter, through simulation;

measuring phase angle (°) and crossover frequency (Hz) before and after applying the calculated shear rate to the slurry; and determining filter clogging according to the change in the measured values, wherein the case that the difference of the phase angle (δ) before and after applying shear is 15° or more and the case that the crossover frequency is less than 0.1 Hz before applying shear and the crossover frequency is 0.1 Hz or more after applying shear are evaluated as filter clogging.

According to one embodiment, the electrode may be a negative electrode. In another embodiment, the simulation is performed using a slurry having a Zero Shear Viscosity of 5 Pa·s or less.

According to one embodiment, the phase angle (δ) before applying shear to the slurry may be 55° to 70°, and the case that the difference of the phase angle (δ) before and after applying shear to the slurry is 15° or more may be evaluated as filter clogging.

According to one embodiment, the shear rate may be 2000 s$^{-1}$ or more.

According to one embodiment, the slurry for manufacturing a negative electrode of a battery may contain at least one metal-based active material selected from metals such as Al, Si, Sn etc., that can combine with lithium, amorphous compounds mainly composed of oxides such as $SiO_2$, $SnO_2$, etc., and lithium titanate ($Li_4Ti_5O_{12}$); and at least one carbon-based active material selected from natural graphite, artificial graphite, soft carbon, hard carbon and graphene.

According to one embodiment, the slurry for manufacturing an electrode may contain plate-type artificial graphite.

Figure 3:
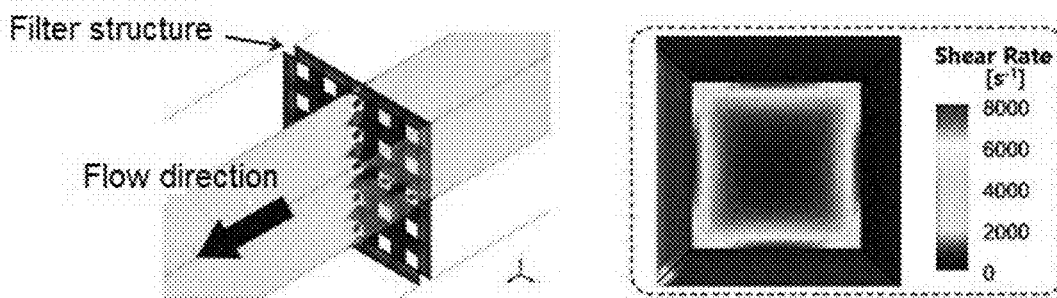
FIG. 3 shows simulation of shear rate that occurs when slurry passes through a filter.

In one embodiment, according to the method of the present invention, as shown in FIG. 3, it can be confirmed that when the filter passing simulation is performed by using a negative electrode slurry having Zero Shear Viscosity of about 5 Pa·s, the shear rate of about 2000 s$^{-1}$ or more is applied to the edges of the filter mesh. By referring the simulation results, it is possible to evaluate the possibility of occurrence of filter closing issue by changing viscoelasticity after applying shear rate of 2000 s$^{-1}$ or more, preferably 2500 s$^{-1}$ to 3000 s$^{-1}$, to the slurry. The viscoelasticity is an index representing viscosity and elasticity of an object. The viscoelasticity evaluation of the slurry before and after shearing uses the change in phase angle (δ) and crossover frequency.

Figure 4:
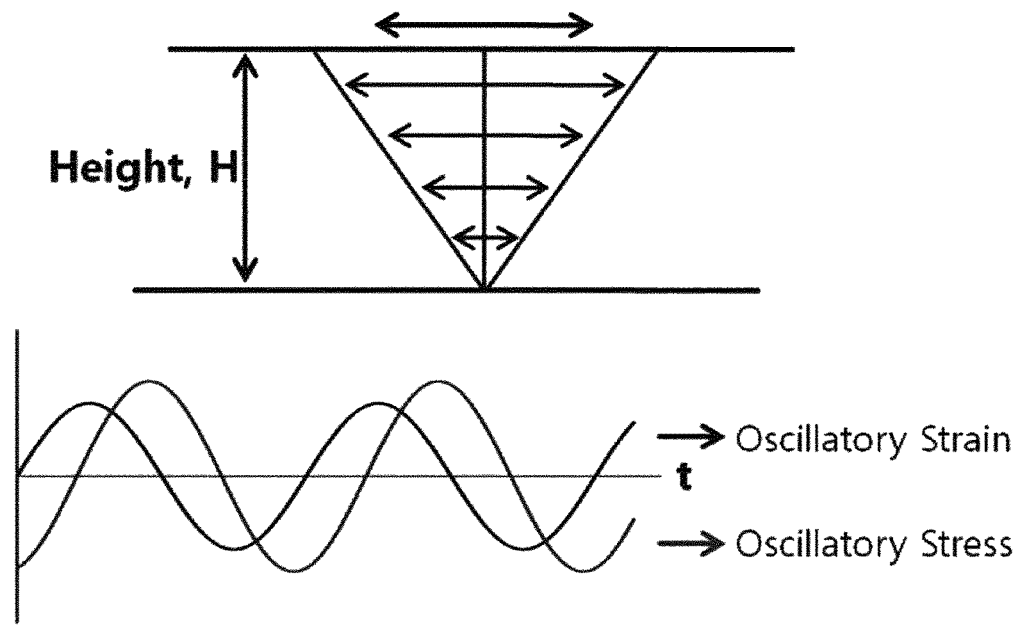
FIG. 4 illustrates the principle of measuring viscoelasticity by applying sinusoidal oscillation (strain) to slurry before and after applying shear and then measuring the resulting response (stress).

The viscoelasticity analysis involves periodically applying sinusoidal strain to a sample before and after applying shear and then measuring the resulting stress exhibited by the sample. The principle is shown in FIG. 4.

The strain and stress associated with the viscoelasticity are represented by the following Formula 1 and Formula 2, respectively. From Formula 2, it can be found that when sinusoidal strain is applied to a viscoelastic polymer sample, stress as the resulting response is divided into elasticity and viscosity.

$$\gamma(t)=\gamma_0 \sin(\omega t) \quad \text{[Formula 1]}$$

$$\sigma(t)=\sigma_0 \sin(\omega t+\delta)=\gamma_0[G'(\omega)\sin(\omega t)+G''(\omega)\cos(\omega t)] \quad \text{[Formula 2]}$$

In Formula 2, G' refers to elasticity (storage modulus) and G" refers to viscosity (loss modulus).

The phase angle (δ) can be represented as the ratio of viscosity (G") to elasticity (G') as shown in the following Formula 3. When the phase angle (δ) is smaller than 45°, it means that the elasticity is larger than the viscosity, and when the phase angle (δ) is larger than 45°, it means that the elasticity is smaller than the viscosity. If the phase angle (δ) is smaller than 45°, active material particles in the slurry can form a network structure.

$$\tan \delta = G''(\omega)/G'(\omega) \quad \text{[Formula 3]}$$

According to one embodiment, the phase angle (δ) before applying shear to the slurry may be 55° to 70°, and the case that the difference of the phase angle (δ) before and after applying shear to the slurry is 15° or more may be evaluated as filter clogging.

The crossover frequency is the frequency at which the elasticity (G') and the viscosity (G'') become equal. It means that the smaller the frequency, the more possible the active material particles in the slurry will form the network structure. It means that before applying shear, the viscosity is larger than the elasticity, but when the elasticity is stronger by shear, the particles are more likely to coagulate when passing through the filter. Accordingly, the possibility of filter clogging increases. Thus, the filter clogging issue can be evaluated by using the degree of the phase angle (δ) and the crossover frequency before and after applying shear.

The frequency at which the elasticity (G') and the viscosity (G'') become equal (crossover frequency) may vary depending on the structures of the particles, and the stronger network of the particles, the smaller the crossover frequency.

According to one embodiment, the crossover frequency before applying shear to the slurry may be less than 0.1 Hz, and when the crossover frequency is 0.1 Hz or more, preferably 0.5 Hz or more after applying shear, it may be evaluated as filter clogging.

The method for evaluating filter clogging of slurry for manufacturing an electrode according to the present invention can be applied in a process of coating an electrode with active material slurry, and particularly, it can be more usefully applied in a process of manufacturing a negative electrode for a lithium ion secondary battery, a lithium ion polymer secondary battery and the like.

As described above, the present invention provides a method that can predict and evaluate filter clogging in a filtering process filtering large particles contained in slurry during coating an electrode with slurry for manufacturing an electrode, by the changes of phase angle (δ) and crossover frequency before and after applying shear to the slurry. Therefore, the present invention can enhance the efficiency of a battery manufacturing process.

MODE FOR INVENTION

Hereinafter, the present invention is explained by the following examples in more detail. The following examples are intended to further illustrate the present invention. Accordingly, those of ordinary skill in the art will recognize that various changes and modifications of the embodiments described herein can be made without departing from the scope and spirit of the invention.

Example

In the following Example, the phase angle (δ) and the crossover frequency of the sample with filter clogging issue and the sample without filter clogging issue were compared.

As slurry for manufacturing an electrode, the samples which have similar composition but different types of active material were prepared.

The shear rate occurring when the slurry sample passes through the filter was calculated through simulation. Filter passing simulation was performed by using a negative electrode slurry having Zero Shear Viscosity of about 5 Pa·s. As a result, the shear rate was 2500 $s^{-1}$. The phase angle (δ) and the crossover frequency were measured before applying the shear rate to the slurry sample. By passing the slurry sample through a filter, the slurry with filter clogging issue and the slurry without filter clogging issue were divided. The phase angle (δ) and the crossover frequency were measured after applying the shear rate to the slurry sample.

<Method for Evaluating Filter Clogging Issue>

For the slurry with filter clogging issue and the slurry without filter clogging issue, rheological properties (viscosity, phase angle (δ), crossover frequency) were measured. The measuring instrument was a DHR2 (Dynamic Hybrid Rheometer) from TA Instruments, one of rotational rheometers. The viscosity was calculated by loading the slurry between two parallel plates and then measuring the stress applied thereto while rotating the plates at a constant speed, and the phase angle (δ) and the crossover frequency were measured through oscillation test. The results of the measurements are illustrated in FIGS. 5 to 8.

Figure 5:
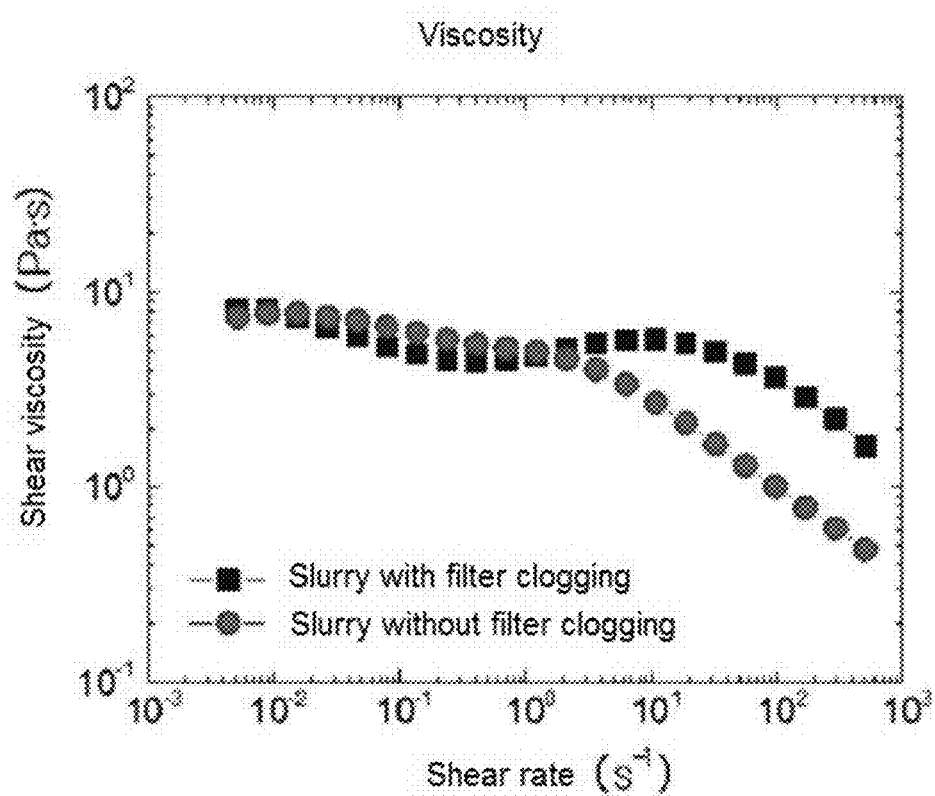
FIG. 5 is a graph showing shear viscosity change of slurry with filter clogging issue and slurry without filter clogging issue depending on shear rate.

FIG. 5 is a graph showing the shear viscosity vs. the shear rate. According to FIG. 5, it can be found that the shear viscosity of the slurry with filter clogging issue (-■-) is more than $10^\circ$ $s^{-1}$ is higher that of the slurry without filter clogging issue (-●-) in the section where the shear rate.

Figure 6:
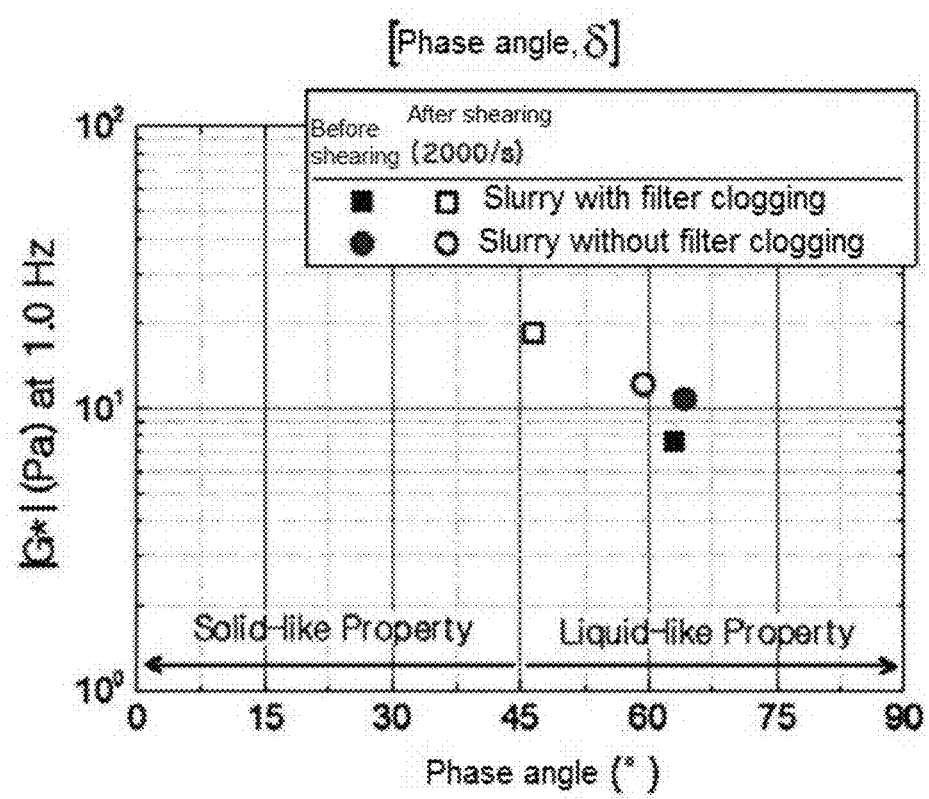
FIG. 6 is a graph showing phase angle (δ) change of slurry with filter clogging issue and slurry without filter clogging issue before and after shearing.

FIG. 6 shows the phase angle (δ) change of the slurry with filter clogging issue and the slurry without filter clogging issue before and after shearing. According to FIG. 6, it can be found that the phase angle (δ) change of the slurry with filter clogging issue (■ □) before and after shearing is significantly larger than that of the slurry without filter clogging (● ○).

Figure 7:
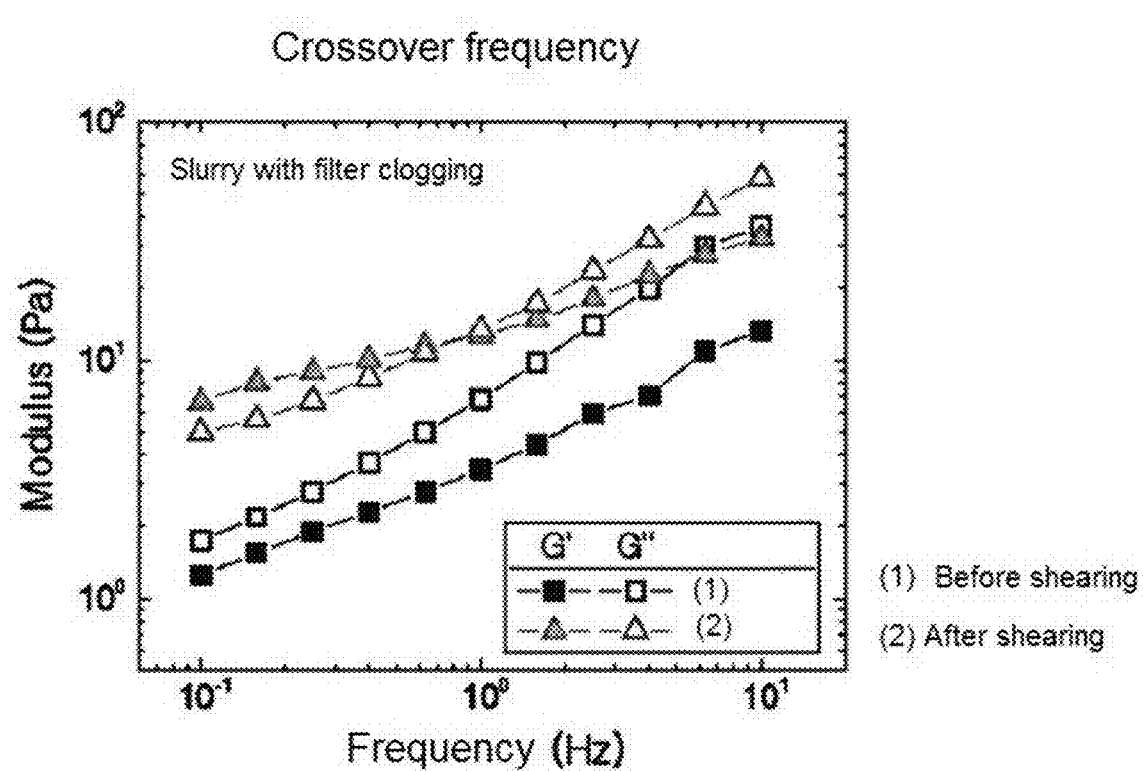
FIG. 7 is a graph showing crossover frequency change of slurry with filter clogging issue before and after shearing.
Figure 8:
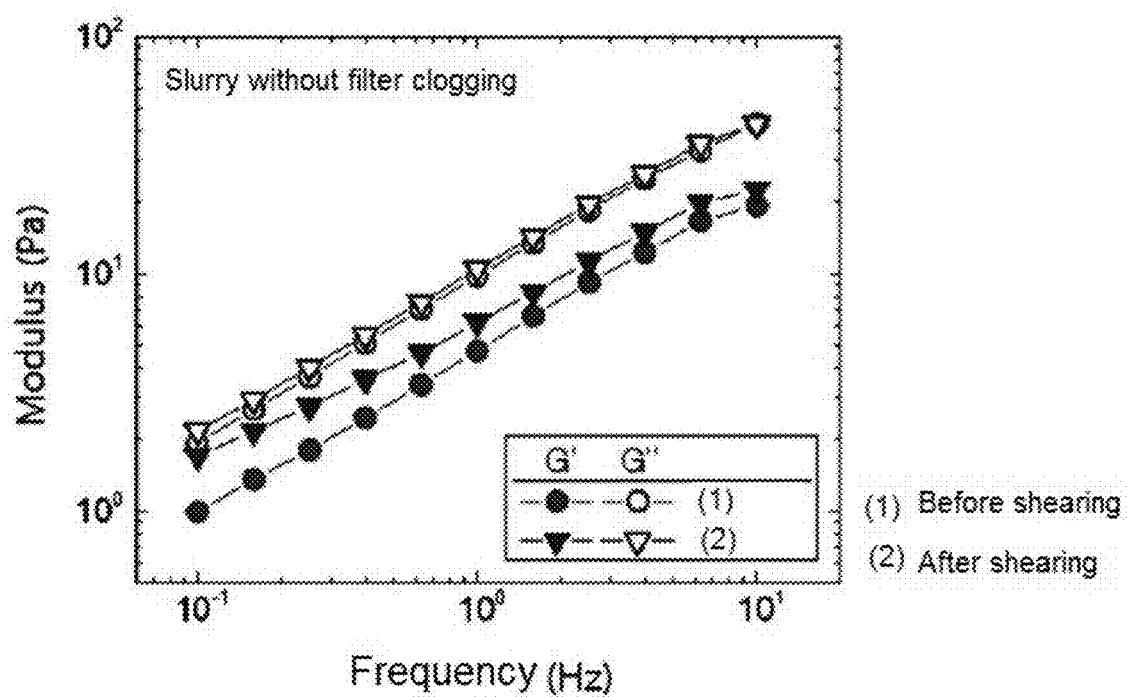
FIG. 8 is a graph showing crossover frequency change of slurry without filter clogging issue before and after shearing.

FIG. 7 and FIG. 8 are graphs showing the crossover frequency change of the slurry with filter clogging issue and the slurry without filter clogging issue before and after applying shear, respectively.

As shown in FIG. 7, in the slurry with filter clogging issue, the crossover frequency after applying shear (-▲- -Δ-) is significantly increased compared with the crossover frequency before applying shear (-■- -□-). This indicates that the network between particles becomes weak and thus, it means that the possibility of coagulation of the particles is increased.

On the other hand, in FIG. 8, it can be found that the slurry without filter clogging issue has little change in the crossover frequency before applying shear (-●- -○-) and after applying shear (-▼- -∇-).

Based on the graphs of FIGS. 6 to 8, the measurement values of the phase angle (δ) and the crossover frequency, and the variation range of the phase angle (δ) of the slurry without filter clogging issue and the slurry with filter clogging issue before and after applying shear are listed in the following Table 1.

TABLE 1

|  | Phase angle (δ) (°) | | | Crossover frequency (Hz) | |
| --- | --- | --- | --- | --- | --- |
|  | Before shearing | After shearing | Variation range | Before shearing | After shearing |
| Slurry with filter clogging | 63.1 | 46.5 | −16.6 | <0.1 | 0.8 |
| Slurry without filter clogging | 64.2 | 59.4 | −4.8 | <0.1 | <0.1 |

As can be seen from Table 1, the filter clogging issue occurred when the phase angle (δ) difference before and after applying shear to the slurry was 16.6°. Furthermore, the filter clogging issue occurred when the crossover frequency before applying shear was less than 0.1 Hz and the crossover frequency after applying shear was 0.8 Hz.

Accordingly, the evaluation method of the present invention which can predict the occurrence of filter clogging issue when the difference of the phase angle (δ) of the slurry before and after applying shear is 15° or more and when the crossover frequency is less than 0.1 Hz before applying shear and the crossover frequency is 0.1 Hz or more after applying shear has an effect of improving efficiency of a battery manufacturing process.

Although specific embodiments of the present invention are described in detail as described above, it will be apparent to those skilled in the art that the specific description is merely desirable exemplary embodiment and should not be construed as limiting the scope of the present invention. Therefore, the substantial scope of the present invention is defined by the accompanying claims and equivalent thereof.

The invention claimed is:

1. A pre-manufacturing process for determining a likelihood of occurrence of filter clogging during coating of a slurry for manufacturing an electrode without passing the slurry directly through a filter, comprising:
    calculating a shear rate generated when the slurry passes through the filter;
    measuring a phase angle (°) and a crossover frequency (Hz) before and after applying the calculated shear rate to the slurry to determine a change in measured values before and after applying the calculated shear rate; and
    determining the likelihood of occurrence of filter clogging by determining whether a difference of the phase angle (δ) before and after applying shear is 15° or more, and the crossover frequency is less than 0.1 Hz before applying shear and the crossover frequency is 0.1 Hz or more after applying shear,
    wherein the shear rate calculated is 2000 $s^{-1}$ or more.

2. The method of claim 1, wherein the electrode is a negative electrode.

3. The method of claim 1, wherein the slurry passed through the filter has Zero Shear Viscosity of 5 Pa·s or less.

4. The method of claim 1, wherein the likelihood of occurrence of filter clogging is determined by whether the crossover frequency is 0.5 Hz or more after applying shear to the slurry.

5. The method of claim 1, wherein the likelihood of occurrence of filter clogging is determined by whether the phase angle (δ) before applying shear to the slurry is 55° to 70°, and the difference of the phase angle (δ) before and after applying shear to the slurry is 15° or more.

6. The method of claim 1, wherein the shear rate calculated is 2500 $s^{-1}$.

7. The method of claim 1, wherein the slurry for manufacturing an electrode comprises plate-type graphite.

* * * * *